United States Patent
Wang

(10) Patent No.: US 10,324,326 B2
(45) Date of Patent: Jun. 18, 2019

(54) LIQUID CRYSTAL DISPLAY PANEL AND CELL METHOD THEREOF

(71) Applicant: Shenzhen China Star Optoelectronics Technology Co., Ltd., Shenzhen (CN)

(72) Inventor: Jinjie Wang, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 136 days.

(21) Appl. No.: 15/122,420

(22) PCT Filed: Apr. 21, 2016

(86) PCT No.: PCT/CN2016/079804
§ 371 (c)(1),
(2) Date: Aug. 30, 2016

(87) PCT Pub. No.: WO2017/173672
PCT Pub. Date: Oct. 12, 2017

(65) Prior Publication Data
US 2018/0149910 A1    May 31, 2018

(30) Foreign Application Priority Data
Apr. 5, 2016   (CN) .......................... 2016 1 0206334

(51) Int. Cl.
*G02F 1/1335* (2006.01)
*G02F 1/1339* (2006.01)
(Continued)

(52) U.S. Cl.
CPC ...... *G02F 1/133512* (2013.01); *G02F 1/1339* (2013.01); *G02F 1/1345* (2013.01);
(Continued)

(58) Field of Classification Search
CPC ......... G02F 1/133512; G02F 1/133514; G02F 1/1339; G02F 1/1345; G02F 1/1368;
(Continued)

(56) References Cited

U.S. PATENT DOCUMENTS

2007/0273821 A1* 11/2007 Liou ..................... G02F 1/1339
349/153
2012/0257132 A1* 10/2012 Kitajima ........... G02F 1/133512
349/42
(Continued)

FOREIGN PATENT DOCUMENTS

| CN | 103048828 A | 4/2013 |
| CN | 104849905 A | 8/2015 |

*Primary Examiner* — Joseph M Galvin, III
(74) *Attorney, Agent, or Firm* — Leong C. Lei

(57) ABSTRACT

The present invention provides a liquid crystal display panel and a cell method thereof. The liquid crystal display panel comprises a TFT array substrate (100), a color filter substrate (200) and sealant (300) located between the TFT array substrate (100) and the color filter substrate (200), and the surrounding region of the TFT array substrate (100) is provided with the a plurality of WOA (120) and the surrounding region of the color filter substrate (200) is provided with a black matrix (220), and the silt region of the black matrix (220) is formed with a plurality of slits (223) corresponding to the sealant (300), and thus to allow the ultraviolet light penetrating the black matrix (220), and the sealant (223) to irradiate on the sealant (300) for speeding up the solidification without forming the slits on the WOA (120), and the width of the WOA (120) is narrow.

13 Claims, 3 Drawing Sheets

(51) Int. Cl.
 *G02F 1/1362* (2006.01)
 *G02F 1/1368* (2006.01)
 *G02F 1/1345* (2006.01)

(52) U.S. Cl.
 CPC ...... *G02F 1/1368* (2013.01); *G02F 1/133514* (2013.01); *G02F 1/136286* (2013.01)

(58) Field of Classification Search
 CPC ............... H01L 27/124; H01L 27/1288; H01L 27/1259; H01L 27/12; H01L 27/127
 See application file for complete search history.

(56) References Cited

U.S. PATENT DOCUMENTS

2015/0029428 A1* 1/2015 Wang ..................... G02B 5/201
 349/42
2018/0074353 A1* 3/2018 Hirata ................... G02F 1/1339

* cited by examiner

LIQUID CRYSTAL DISPLAY PANEL AND CELL METHOD THEREOF

FIELD OF THE INVENTION

The present invention relates to a liquid crystal display field, and more particularly to a liquid crystal display panel and a cell method thereof.

BACKGROUND OF THE INVENTION

The Liquid Crystal Display (LCD) is one of the most widely utilized flat panel displays, and the liquid crystal display panel is the core component of the Liquid Crystal Display.

The traditional liquid crystal display panel generally comprises a Color Filter (CF), a Thin Film Transistor Array Substrate (TFT Array Substrate) and a Liquid Crystal Layer positioned inbetween. The working principle is that the liquid crystal molecules are positioned between the two parallel glass substrates, and many vertical and horizontal tiny little electrical lines are between the two glass substrates, and the light of backlight module is reflected to generate images by applying driving voltages or not for controlling the direction changes of the liquid crystal molecules. The thin film transistor (TFT) array manufactured on the thin film transistor array substrate is employed to drive the liquid crystal to rotate to control the display of each pixel. The color filter substrate comprises RGB color filter layers, which is employed for forming colors of each pixel.

In the present liquid crystal display, both the drive voltage and the data signal required for driving the pixels of the liquid crystal display panel are provided by the sequence controller (TCON) on the liquid crystal display panel, and are transmitted into the liquid crystal display panel through the plurality of Chips On Film (COF) to make the liquid crystal display panel normally work. The COF are connected with the Wires On Array (WOA) on the TFT array substrate. WOA is employed to transmit the signal between the two COF, and generally located at the edge of the liquid crystal; display panel.

In prior art, as implementing the cell process of the liquid crystal display panel, the edge position of the liquid crystal display panel is coated with sealant for bonding the color filter substrate and the TFT array substrate. As shown in FIG. 1, which is a structure diagram of an edge position of a liquid crystal display panel according to prior art, the liquid crystal display panel comprises a TFT array substrate 100' and a color filter substrate 200' which are oppositely located, and sealant located between the TFT array substrate 100' and the color filter substrate 200'. The edge of the TFT array substrate 100' is provided with the WOA 120', and the edge of the color filter substrate 200' is provided with the black matrix 220', and the sealant 300' is located between the WOA 120' and the black matrix 220'. In the cell process, the sealant 300' has to be irradiated with the ultraviolet (UV) ray for promoting the freezing rate. In prior art, the silt 121' is located among the WOA 120' on which the sealant has provided so that the ultraviolet ray can passes through the silt 121' to irradiate on the sealant 300' from one side of the TFT array substrate to speed up the solidification rate. The slit design of the WOA 120' will increase the resistance of the entire WOA 120'. For keeping the same resistance, the width of the WOA 120' has to be increased. At present, the narrow frame liquid crystal display has higher competitiveness in the market with the beautiful appearance, and has become one of the main development directions of the liquid crystal display. The overlarge width of the WOA will restrict the narrow frame design of the liquid crystal display, and is disadvantageous for the narrow frame development of the liquid crystal display.

SUMMARY OF THE INVENTION

An objective of the present invention is to provide a liquid crystal display panel, which can reduce a resistance and an area of WOA to achieve the narrow frame of the liquid crystal display panel and to promote the product competitiveness.

Another objective of the present invention is to provide a cell method of a liquid crystal display panel, which can reduce a resistance and an area of WOA to achieve the narrow frame of the liquid crystal display panel and to promote the product competitiveness.

For realizing the aforesaid objectives, the present invention provides a liquid crystal display panel, comprising: a TFT array substrate, a color filter substrate oppositely located to the TFT array substrate, and sealant located between the TFT array substrate and the color filter substrate;

wherein both the color filter substrate and the TFT array substrate comprises an active display region in the middle and a surrounding region at periphery of the active display region;

the surrounding region of the TFT array substrate comprises a plurality of wires on array (WOA), and the surrounding region of the color filter substrate comprises a black matrix surrounding the active display region;

the black matrix comprises: a silt region and non silt regions located at two sides of the silt region;

the silt region is formed with a plurality of slits penetrating the black matrix;

the sealant is located among the slit region of the black matrix and the plurality of WOA.

A width of the slit region is larger than a width of the sealant.

A distance between an edge of the slit region and an edge of the sealant at the same side is larger than or equal to 400 μm.

A gap is formed between two adjacent WOA, and a position of the slit formed on the color filter substrate does not overlap with a position of the gap corresponding thereto.

The TFT array substrate is further formed with a plurality of TFTs distributed in array, and the color filter substrate is further formed with a color filter layer.

The present invention further provides a cell method of a liquid crystal display panel, comprising steps of:

step 1, providing a TFT array substrate and a color filter substrate;

wherein both the color filter substrate and the TFT array substrate comprises an active display region in the middle and a surrounding region at periphery of the active display region;

the surrounding region of the TFT array substrate comprises a plurality of wires on array (WOA), and the surrounding region of the color filter substrate comprises a black matrix surrounding the active display region;

the black matrix comprises: a silt region and non silt regions located at two sides of the silt region;

the silt region is formed with a plurality of slits penetrating the black matrix;

step 2, coating seal glue on the silt region of the color filter substrate, and para bonding the color filter substrate and the TFT array substrate to make the seal glue located among the silt region of the black matrix and the plurality of WOA;

step 3, employing ultraviolet light to irradiate the seal glue from one side of the color filter substrate, wherein the ultraviolet light penetrates the color filter substrate and the slit to irradiate on the seal glue to solidify the seal glue to form sealant to accomplish a cell process of the liquid crystal display panel.

A width of the sealant formed in the step 3 is smaller than a width of the slit region.

A distance between an edge of the slit region and an edge of the sealant at the same side is larger than or equal to 400 µm.

A gap is formed between two adjacent WOA, and a position of the slit formed on the color filter substrate does not overlap with a position of the gap corresponding thereto.

The TFT array substrate is further formed with a plurality of TFTs distributed in array, and the color filter substrate is further formed with a color filter layer.

The present invention further provides a liquid crystal display panel, comprising: a TFT array substrate, a color filter substrate oppositely located to the TFT array substrate, and sealant located between the TFT array substrate and the color filter substrate;

wherein both the color filter substrate and the TFT array substrate comprises an active display region in the middle and a surrounding region at periphery of the active display region;

the surrounding region of the TFT array substrate comprises a plurality of wires on array (WOA), and the surrounding region of the color filter substrate comprises a black matrix surrounding the active display region;

the black matrix comprises: a silt region and non silt regions located at two sides of the silt region;

the silt region is formed with a plurality of slits penetrating the black matrix;

the sealant is located among the slit region of the black matrix and the plurality of WOA;

wherein a width of the slit region is larger than a width of the sealant;

wherein a gap is formed between two adjacent WOA, and a position of the slit formed on the color filter substrate does not overlap with a position of the gap corresponding thereto.

The benefits of the present invention are: the liquid crystal display panel provided by the present invention comprises a TFT array substrate, a color filter substrate and sealant located between the TFT array substrate and the color filter substrate, and the surrounding region of the TFT array substrate is provided with the WOA and the surrounding region of the color filter substrate is provided with a black matrix, and the black matrix comprises: a silt region and non silt regions located at two sides of the silt region, and the silt region is formed with a plurality of slits penetrating the black matrix, and the sealant is located under the slit region of the black matrix, and the plurality of WOA is located under the sealant so that the ultraviolet light for speeding up the seal glue solidification can pass the slit at one side of the color filter substrate to irradiate on the seal glue without forming the slits on the WOA, and the resistance of the WOA will not be increased, and thus, it is not required to increase the width of the WOA. In comparison with prior art, a resistance and an area of WOA can be reduced to achieve the narrow frame of the liquid crystal display panel and to promote the product competitiveness. The cell method of a liquid crystal display panel provided by the present invention can reduce a resistance and an area of WOA to achieve the narrow frame of the liquid crystal display panel and to promote the product competitiveness.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
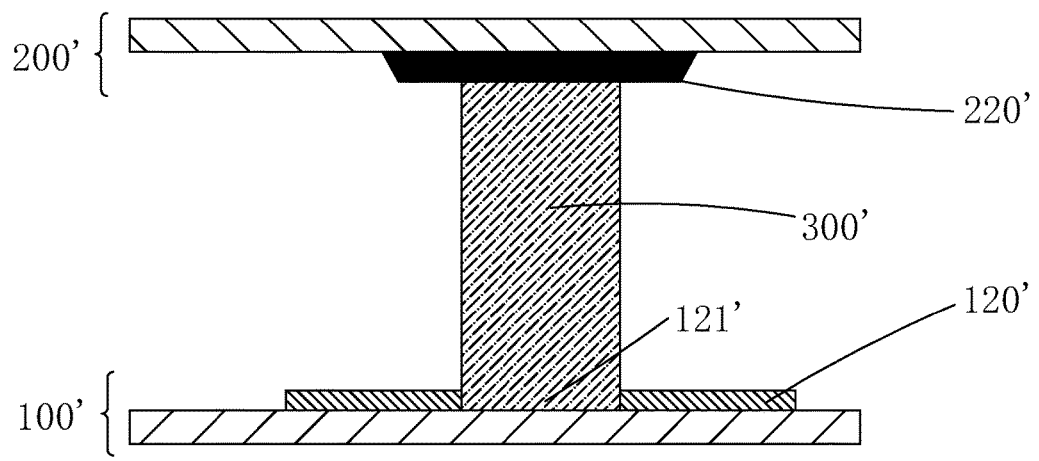
FIG. 1 is a structure diagram of an edge position of a liquid crystal display panel according to prior art.
Figure 2:
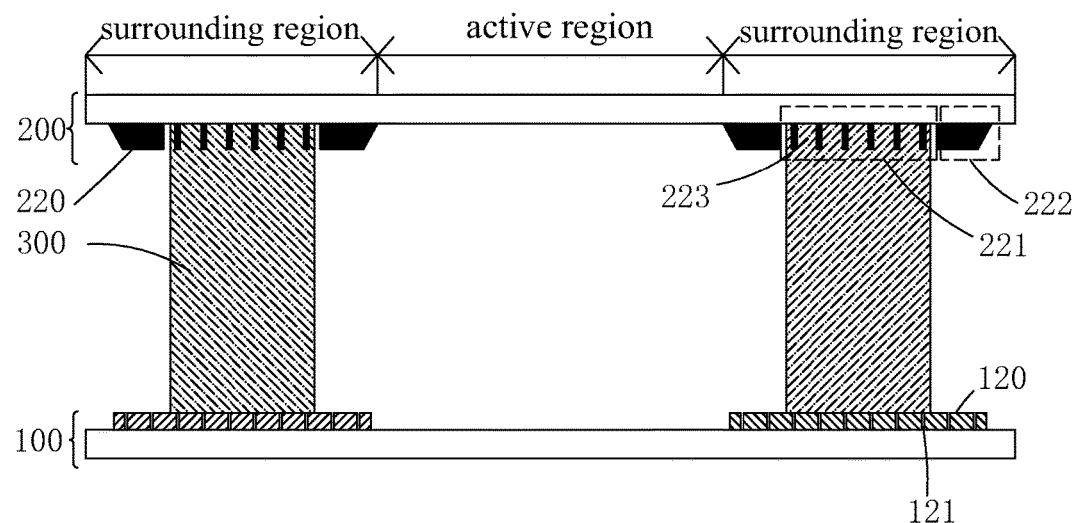
FIG. 2 is a structure diagram of a liquid crystal display panel according to the present invention.

Please refer to FIG. 2. The present invention provides a liquid crystal display panel, comprising: a TFT array substrate 100, a color filter substrate 200 oppositely located to the TFT array substrate, and sealant 300 located between the TFT array substrate 100 and the color filter substrate 200.

Specifically, both the color filter substrate 200 and the TFT array substrate 100 comprises an active display region in the middle and a surrounding region at periphery of the active display region.

Furthermore, the active display region of the TFT array substrate 100 is formed with a plurality of TFTs distributed in array, and the active display region of the color filter substrate 200 is formed with a color filter layer.

the surrounding region of the TFT array substrate comprises a plurality of wires on array (WOA) 120, and the surrounding region of the color filter substrate 200 comprises a black matrix 220 surrounding the active display region; the black matrix 220 comprises: a silt region 221 and non silt regions 222 located at two sides of the silt region 221;

the silt region 221 is formed with a plurality of slits 223 penetrating the black matrix 220, and regions except the slits 223 are shaded by the black matrix 220, and the black matrix 220 of the on silt regions 222 is an entire black matrix without pattern. The WOA 120 are an entire plane metal wire.

Specifically, the slit region 221 is employed to expose the sealant 300 so that as the sealant 300 is solidified, the ultraviolet Ray (UV Ray) can be employed to irradiate the seal glue for forming the sealant 300 from one side of the color filter substrate 200 to speed up the solidification. In comparison with prior art, the present invention moves the slit for exposing the sealant from the WOA to the black matrix. Thus, it is not required to form the slits on the WOA, and the resistance of the WOA will not be increases, and thus, it is not required to increase the width of the WOA, and has obvious merits as being applied for the narrow frame liquid crystal display.

Besides, for providing the enough deviation value for the seal glue coating, a width of the slit region 221 can be further set to be larger than a width of the sealant 300. Specifically, a distance between an edge of the slit region 221 and an edge of the sealant 300 at the same side is larger than or equal to 400 μm.

Specifically, the plurality of WOA 120 is connected with various COF and transmit various signals. A gap 121 is formed between two adjacent WOA 120, and a position of the slit 223 formed on the color filter substrate 200 does not overlap with a position of the gap 121 corresponding thereto. Namely, all the gaps 121 between the two adjacent WOA 120 are covered by the black matrix 220 to ensure that the backlight irradiating from one side of the TFT array substrate 100 is at least shaded by one of WOA 120 and the black matrix 220 to prevent the generation of the light leakage.

Significantly, as implementing the cell process to the liquid crystal display panel, the ultraviolet light irradiates on the liquid crystal display panel from one side of the color filter substrate 200. The ultraviolet light penetrates the color filter substrate 200 and the slits 223 in the slit region 221 to irradiate on the seal glue which needs to be solidified for speeding up the solidification rate of the seal glue.

Figure 3:
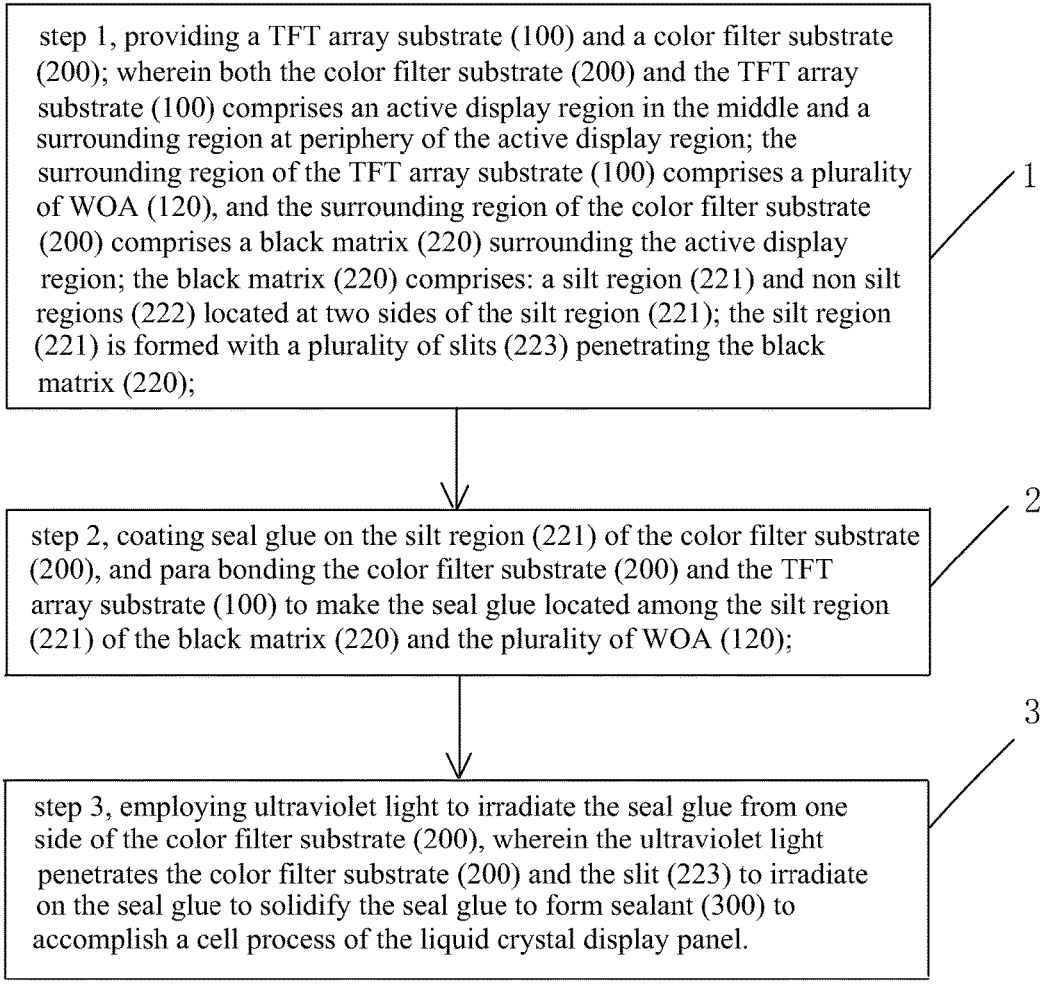
FIG. 3 is a flowchart of a cell method of a liquid crystal display panel according to the present invention.

Please refer to FIG. 3. The present invention further provides a cell method of a liquid crystal display panel, comprising steps of:

step 1, providing a TFT array substrate 100 and a color filter substrate 200;

wherein both the color filter substrate 200 and the TFT array substrate 100 comprises an active display region in the middle and a surrounding region at periphery of the active display region;

the surrounding region of the TFT array substrate comprises a plurality of WOA 120, and the surrounding region of the color filter substrate 200 comprises a black matrix 220 surrounding the active display region;

the black matrix 220 comprises: a silt region 221 and non silt regions 222 located at two sides of the slit region 221;

the silt region 221 is formed with a plurality of slits 223 penetrating the black matrix 220.

Specifically, with a plurality of TFTs distributed in array, and the active display region of the color filter substrate 200 is formed with a color filter layer. The black matrix 220 of the on silt regions 222 is an entire black matrix without pattern.

Furthermore, the plurality of WOA 120 is connected with various COF and transmit various signals. A gap 121 is formed between two adjacent WOA 120, and a position of the slit 221 formed on the color filter substrate 200 does not overlap with a position of the gap 121 corresponding thereto. Namely, all the gaps 121 between the two adjacent WOA 120 are covered by the black matrix 220 to ensure that the backlight irradiating from one side of the TFT array substrate 100 is at least shaded by one of WOA 120 and the black matrix 220 to prevent the generation of the light leakage.

step 2, coating seal glue on the silt region 221 of the color filter substrate 200, and para bonding the color filter substrate 200 and the TFT array substrate 100 to make the seal glue located among the silt region 221 of the black matrix 220 and the plurality of WOA 120.

Specifically, for providing the enough deviation value for the seal glue coating, a width of the slit region 221 is set to be larger than a width of the sealant 300. Specifically, a distance between an edge of the slit region 221 and an edge of the sealant 300 at the same side is larger than or equal to 400 μm.

step 3, employing ultraviolet light to irradiate the seal glue from one side of the color filter substrate 200, wherein the ultraviolet light penetrates the color filter substrate 200 and the slit 223 to irradiate on the seal glue to solidify the seal glue to form sealant 300 to accomplish a cell process of the liquid crystal display panel.

Specifically, the slit region 221 is employed to expose the sealant 300 so that as the sealant 300 is solidified, the ultraviolet light can be employed to irradiate the seal glue from one side of the color filter substrate 200 to speed up the solidification. In comparison with prior art, the present invention moves the slit for exposing the sealant from the WOA to the black matrix. Thus, it is not required to form the slits on the WOA, and the resistance of the WOA will not be increases, and thus, it is not required to increase the width of the WOA, and has obvious merits as being applied for the narrow frame liquid crystal display.

In conclusion, the liquid crystal display panel provided by the present invention comprises a TFT array substrate, a color filter substrate and sealant located between the TFT array substrate and the color filter substrate, and the surrounding region of the TFT array substrate is provided with the WOA and the surrounding region of the color filter substrate is provided with a black matrix, and the black matrix comprises: a silt region and non silt regions located at two sides of the silt region, and the silt region is formed with a plurality of slits penetrating the black matrix, and the sealant is located under the slit region of the black matrix, and the plurality of WOA is located under the sealant so that the ultraviolet light for speeding up the seal glue solidification can pass the slit at one side of the color filter substrate to irradiate on the seal glue without forming the slits on the WOA, and the resistance of the WOA will not be increased, and thus, it is not required to increase the width of the WOA. In comparison with prior art, a resistance and an area of WOA can be reduced to achieve the narrow frame of the liquid crystal display panel and to promote the product competitiveness. The cell method of a liquid crystal display panel provided by the present invention can reduce a resistance and an area of WOA to achieve the narrow frame of the liquid crystal display panel and to promote the product competitiveness.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal display panel, comprising: a TFT array substrate, a color filter substrate oppositely located to the TFT array substrate, and sealant located between the TFT array substrate and the color filter substrate;

wherein both the color filter substrate and the TFT array substrate comprises an active display region in the middle and a surrounding region at periphery of the active display region;

the surrounding region of the TFT array substrate comprises a plurality of wires on array (WOA), which is an entire plane metal wire, and the surrounding region of the color filter substrate comprises a black matrix surrounding the active display region;

the black matrix comprises: a slit region and non slit regions located at two sides of the slit region;

the slit region is formed with a plurality of slits penetrating the black matrix to expose the sealant for being irradiated with ultraviolet Ray from one side of the color filter substrate for solidification of seal glue for forming the sealant and to reduce a resistance and an area of WOA, which is the entire plane metal wire to achieve a narrow frame of the liquid crystal display panel;

the sealant is located among the slit region of the black matrix and the plurality of WOA.

2. The liquid crystal display panel according to claim 1, wherein a width of the slit region is larger than a width of the sealant.

3. The liquid crystal display panel according to claim 2, wherein a distance between an edge of the slit region and an edge of the sealant at the same side is larger than or equal to 400 μm.

4. The liquid crystal display panel according to claim 1, wherein a gap is formed between two adjacent WOA, and a position of the slit formed on the color filter substrate does not overlap with a position of the gap corresponding thereto.

5. The liquid crystal display panel according to claim 1, wherein the TFT array substrate is further formed with a plurality of TFTs distributed in array, and the color filter substrate is further formed with a color filter layer.

6. A cell method of a liquid crystal display panel, comprising steps of:

step 1, providing a TFT array substrate and a color filter substrate;

wherein both the color filter substrate and the TFT array substrate comprises an active display region in the middle and a surrounding region at periphery of the active display region;

the surrounding region of the TFT array substrate comprises a plurality of wires on array (WOA), which is an entire plane metal wire, and the surrounding region of the color filter substrate comprises a black matrix surrounding the active display region;

the black matrix comprises: a slit region and non slit regions located at two sides of the slit region;

the slit region is formed with a plurality of slits penetrating the black matrix;

step 2, coating seal glue on the slit region of the color filter substrate, and para bonding the color filter substrate and the TFT array substrate to make the seal glue located among the slit region of the black matrix and the plurality of WOA;

step 3, employing ultraviolet light to irradiate the seal glue from one side of the color filter substrate, wherein the ultraviolet light penetrates the color filter substrate and the slit for exposing the seal glue to irradiate on the seal glue to solidify the seal glue to form sealant and to reduce a resistance and an area of WOA, which is the entire plane metal wire to achieve a narrow frame of the liquid crystal display panel to accomplish a cell process of the liquid crystal display panel.

7. The cell method of the liquid crystal display panel according to claim 6, wherein a width of the sealant formed in the step 3 is smaller than a width of the slit region.

8. The cell method of the liquid crystal display panel according to claim 7, wherein a distance between an edge of the slit region and an edge of the sealant at the same side is larger than or equal to 400 μm.

9. The cell method of the liquid crystal display panel according to claim 6, wherein a gap is formed between two adjacent WOA, and a position of the slit formed on the color filter substrate does not overlap with a position of the gap corresponding thereto.

10. The cell method of the liquid crystal display panel according to claim 6, wherein the TFT array substrate is further formed with a plurality of TFTs distributed in array, and the color filter substrate is further formed with a color filter layer.

11. A liquid crystal display panel, comprising: a TFT array substrate, a color filter substrate oppositely located to the TFT array substrate, and sealant located between the TFT array substrate and the color filter substrate;

wherein both the color filter substrate and the TFT array substrate comprises an active display region in the middle and a surrounding region at periphery of the active display region;

the surrounding region of the TFT array substrate comprises a plurality of wires on array (WOA), which is an entire plane metal wire, and the surrounding region of the color filter substrate comprises a black matrix surrounding the active display region;

the black matrix comprises: a slit region and non slit regions located at two sides of the slit region;

the slit region is formed with a plurality of slits penetrating the black matrix to expose the sealant for being irradiated with ultraviolet Ray from one side of the color filter substrate for solidification of the sealant and to reduce a resistance and an area of WOA, which is the entire plane metal wire to achieve a narrow frame of the liquid crystal display panel;

the sealant is located among the slit region of the black matrix and the plurality of WOA;

wherein a width of the slit region is larger than a width of the sealant;

wherein a gap is formed between two adjacent WOA, and a position of the slit formed on the color filter substrate does not overlap with a position of the gap corresponding thereto.

12. The liquid crystal display panel according to claim 11, wherein a distance between an edge of the slit region and an edge of the sealant at the same side is larger than or equal to 400 μm.

13. The liquid crystal display panel according to claim 11, wherein the TFT array substrate is further formed with a plurality of TFTs distributed in array, and the color filter substrate is further formed with a color filter layer.

* * * * *